United States Patent [19]

Isozaki

[11] Patent Number: 4,675,564

[45] Date of Patent: Jun. 23, 1987

[54] PERMANENT MAGNET TYPE STEPPING MOTOR

[75] Inventor: Koki Isozaki, Kiryu, Japan

[73] Assignee: Japan Servo Co., Ltd., Tokyo, Japan

[21] Appl. No.: 804,626

[22] Filed: Dec. 5, 1985

[30] Foreign Application Priority Data

Dec. 10, 1984 [JP] Japan .................... 59-259120

[51] Int. Cl.$^4$ .................... H02K 37/00
[52] U.S. Cl. .................... 310/49 R; 310/156; 310/168
[58] Field of Search ........... 310/49, 156, 168, 162–165

[56] References Cited

U.S. PATENT DOCUMENTS

| | | | |
|---|---|---|---|
| 4,255,696 | 3/1981 | Field | 310/49 |
| 4,339,679 | 7/1982 | Urschel | 310/49 |
| 4,423,343 | 12/1983 | Field | 310/49 |

Primary Examiner—Donovan F. Duggan
Attorney, Agent, or Firm—James E. Nilles; Nicholas A. Kees

[57] ABSTRACT

A permanent magnet type stepping motor wherein number of magnetic poles provided radially on the inside periphery of a stator is 16, number of pole teeth provided on a rotor poles is (z) (wherein $z = 16 \, m \pm 4$; (m) denotes a positive integer), 14 poles among 16 have pitch of $(22.5 \mp 45/z)°$ between their own pole teeth and corresponding pole teeth of adjacent poles and other two poles have pitch of $(22.5 \pm 315/z)°$ between their own pole teeth and corresponding pole teeth of adjacent poles.

3 Claims, 5 Drawing Figures

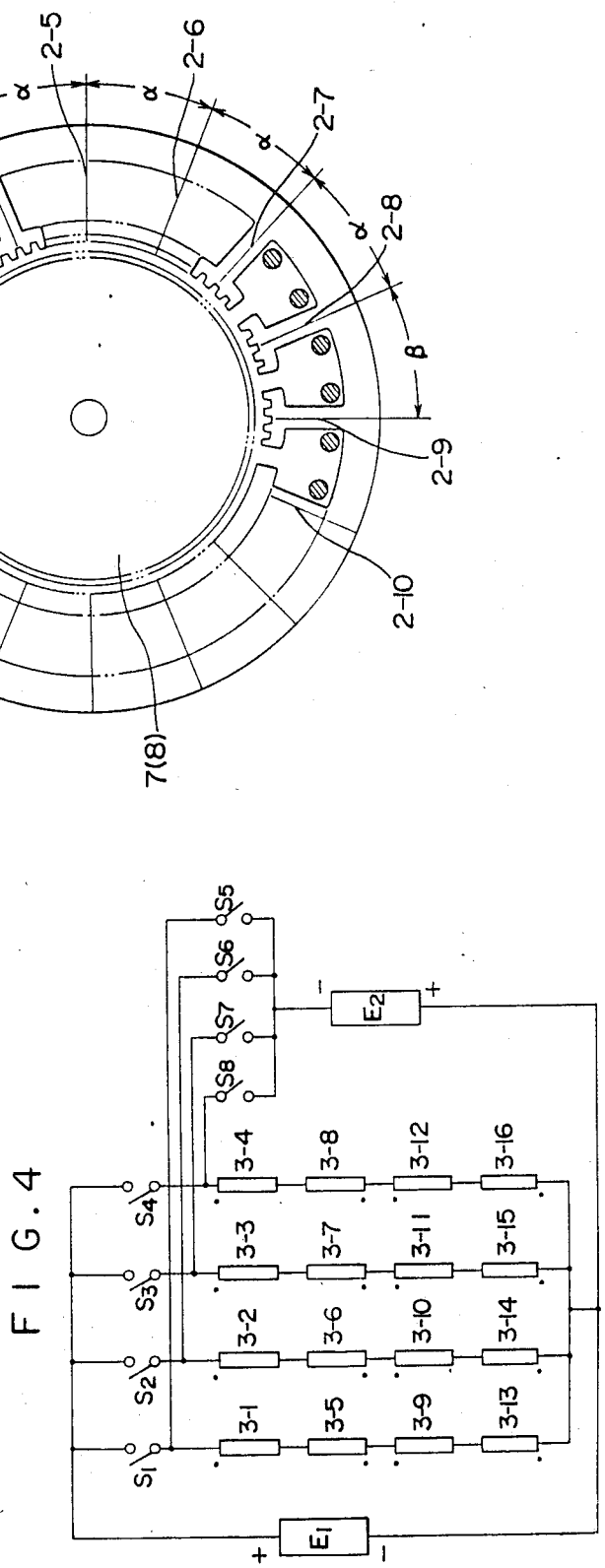
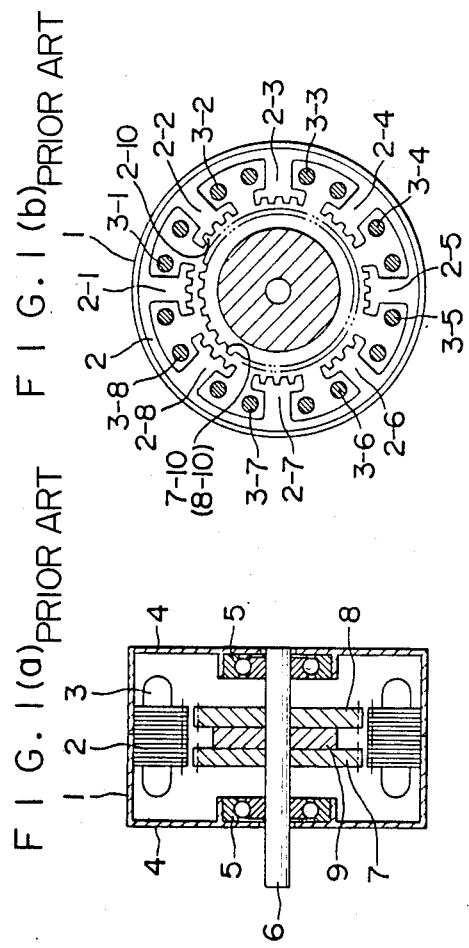

PERMANENT MAGNET TYPE STEPPING MOTOR

BACKGROUND OF THE INVENTION

1. Field of the Invention

The present invention relates to a permanent magnet type stepping motor, and more particularly a permanent magnet type stepping motor which comprises a stator, two rotor poles and a permanent magnet, wherein the stator has a plurality of magnetic poles provided radially on its inside periphery, a plurality of pole teeth are provided on the tip of each pole with an identical pitch, windings are wound on respective magentic poles, pole teeth with the same pitch as the pole teeth of the stator are provided on the whole peripheries of the two rotor poles, and the permanent magnet is magnetized in the direction of a shaft and held by the two rotor poles.

2. Description of the Prior Art

An embodiment of a permanent magnet type stepping motor of the prior art is shown in FIGS. 1(a) and 1(b). In FIGS. 1(a) and 1(b), the reference numeral 1 denotes a stator housing; 2, a stator core; 3, stator windings; and 4 and 4, end brackets.

A plurality (in this example, 8) of magnetic poles 2-1-2-8 are provided on the internal periphery of the stator core 2 and a plurality of pole teeth 2-10 are provided on the tip of each pole with an identical pitch and windings 3-1-3-8 are wound on respective magnetic poles.

Pole teeth 7-10 and 8-10 are provided on the whole peripheries of rotor poles 7 and 8 with the same pitch as the pole teeth 2-10 on the stator poles and positions of the respective pole teeth of the rotor poles 7 and 8 are shifted by 180° to each other. The rotor poles 7 and 8 are attached solidly to a rotor shaft 6 while holding a permanent magnet 9. The pole teeth 7-10 and 8-10 of the rotor are held to face the pole teeth 2-10 of the stator by bearings 5 and 5 so as to be able to rotate freely.

Normally, stator windings on the poles of the positions symmetrical to the shaft are connected in series to form four sets of windings. By applying current to the respective windings successively, the magnetic pole, to the winding of which the current is applied, is magnetized and facing pole teeth of the rotor are attracted by the pole teeth of the magnetized stator pole to generate torque. When the pole teeth of the rotor reach the position where the pole teeth of the rotor and the pole teeth of the stator are aligned, the torque is lost and the rotation is discontinued.

If the current is applied to the windings 3-1 and 3-5 in FIG. 1(b), the magnetic poles 2-1 and 2-5 on which those windings are wound are magnetized. If the pole teeth of the rotor poles 7 and 8 are aligned with the pole teeth of the respective magnetic poles, pole teeth provided on the tips of magnetic poles 2-2 and 2-8 which are adjacent to the pole 2-1; 2-4 and 2-6 which are adjacent to the pole 2-5 and 2-3 and 2-7 which are apart from the poles 2-1 and 2-5 are not aligned with the pole teeth of the rotor at the facing position but shifted by a certain theoretical angle. In other words, the pole teeth provided on the magnetic poles 2-2 and 2-6 are shifted against the facing pole teeth of the rotor by an angle corresponding to ¼ of the pitch of the pole teeth of the rotor to the clockwise direction; the pole teeth provided on the magnetic poles 2-3 and 2-7 are shifted against the facing pole teeth of the rotor by an angle corresponding to 2/4 of the pitch of the pole teeth of the rotor to the clockwise direction; and the pole teeth provided on the magnetic poles 2-4 and 2-8 are shifted against the facing pole teeth of the rotor by an angle corresponding to ¾ of the pitch of the pole teeth of the rotor to the clockwise direction. Therefore, if the current application is discontinued and the current is applied to the windings 3-2 and 3-6 when the rotor is at the position described above, the rotor rotates to the right by the angle corresponding to ¼ of the pitch of the pole teeth of the rotor and stops. This angle of rotation is called a step angle of this stepping motor and is a specific value which is ¼ of the pitch of the pole teeth of the rotor.

In order to make the rotor rotate further right, the current is applied to the windings 3-3 and 3-7 to magnetize the right side adjacent magnetic poles 2-3 and 2-7. In the same way, in order to make the rotor rotate to the left, the current is applied to the windings of the magnetic poles adjacent to the left of the poles excited at present. The number of switchings of the windings to which the current is applied is proportional to the angle of rotation and the direction of the rotation can be controlled by switching the current-applied windings to the right or to the left. Therefore, angle, speed and direction can be controlled by a simple controller; consequently, a large number of stepping motors have been employed as control motors.

In order to increase resolution, one of the control functions of a stepping motor, usually the number of pole teeth is increased. For instance, in the embodiment of FIGS. 1(a), 1(b), a stepping motor with one step angle of 1.8° is realized by providing 50 pole teeth on both rotor poles 7 and 8 and providing 5 pole teeth on each tip of 8 poles of the stator.

However, such stepping motors as described above have increasingly been applied to magnetic disc driving apparatuses employed as external memory apparatuses of electronic computers and have been used as the driving force of magnetic heads of the magnetic disc driving apparatuses and step angles of the stepping motors have been matched to the pitch of record tracks of the magnetic discs. Recently, an apparatus which enables recording more data on one disc by reducing width of the tracks to ½ or ¼ of their previous width has been developed, and accordingly, the step angle of a stepping motor has been required to be reduced to ½ or ¼ of the previous angle.

In principle, resolution could be infinitely improved by increasing the number of pole teeth provided on the rotor. However, as there was a limitation of the dimensions of the motor, and there was also a limitation of processing teeth pitch for increasing the number of pole teeth keeping the diameter of the rotor almost equal to the conventional one, consequently, 0.9°, a half of 1.8° was the minimum.

SUMMARY OF THE INVENTION

It is an object of the present invention to provide a permanent magnet type stepping motor which has a finer step angle without increasing the dimensions of the stepping motor of the prior art.

It is another object of the present invention to provide a permanent magnet type stepping motor wherein one step angle can be ⅛ of the pitch of pole teeth provided on a rotor pole which means a half of ¼ of the pitch of pole teeth in a stepping motor of prior art.

The objects described above can be realized by a permanent magnet type stepping motor which comprises a stator, two rotor poles and a permanent magnet, wherein the stator has a plurality of magnetic poles provided radially on lts inside periphery, a plurality of pole teeth are provided on the tip of each pole with an identical pitch, windings are applied on respective magnetic poles, pole teeth with the same pitch as the pole teeth of the stator are provided on the whole peripheries of the two rotor poles, and the permanent magnet is magnetized in the direction of a shaft and held by the rotor poles, and wherein, when the number of magnetic poles is 16 and the number of pole teeth provided on the rotor poles is (z) (wherein z=16 m±4; (m) denotes a positive integer), 14 poles among 16 have pitch of $(22.5 \mp 45/z)°$ between their own pole teeth and corresponding pole teeth of adjacent poles and other two poles have pitch of $(22.5 \pm 315/z)°$ between their own pole teeth and corresponding pole teeth of adjacent poles.

Other and further objects and features of the present invention will appear more fully from the following description taken in connection with the accompanying drawings thereof.

BRIEF DESCRIPTION OF THE DRAWINGS

FIGS. 1(a) and 1(b) are a vertical sectional view and a side view a permanent magnet type stepping motor of the prior art;

FIG. 2 is a vertical sectional front view a permanent magnet type stepping motor of the present invention;

FIG. 4 is a circuit diagram of the stator windings.

EMBODIMENT OF THE INVENTION

Figure 3:
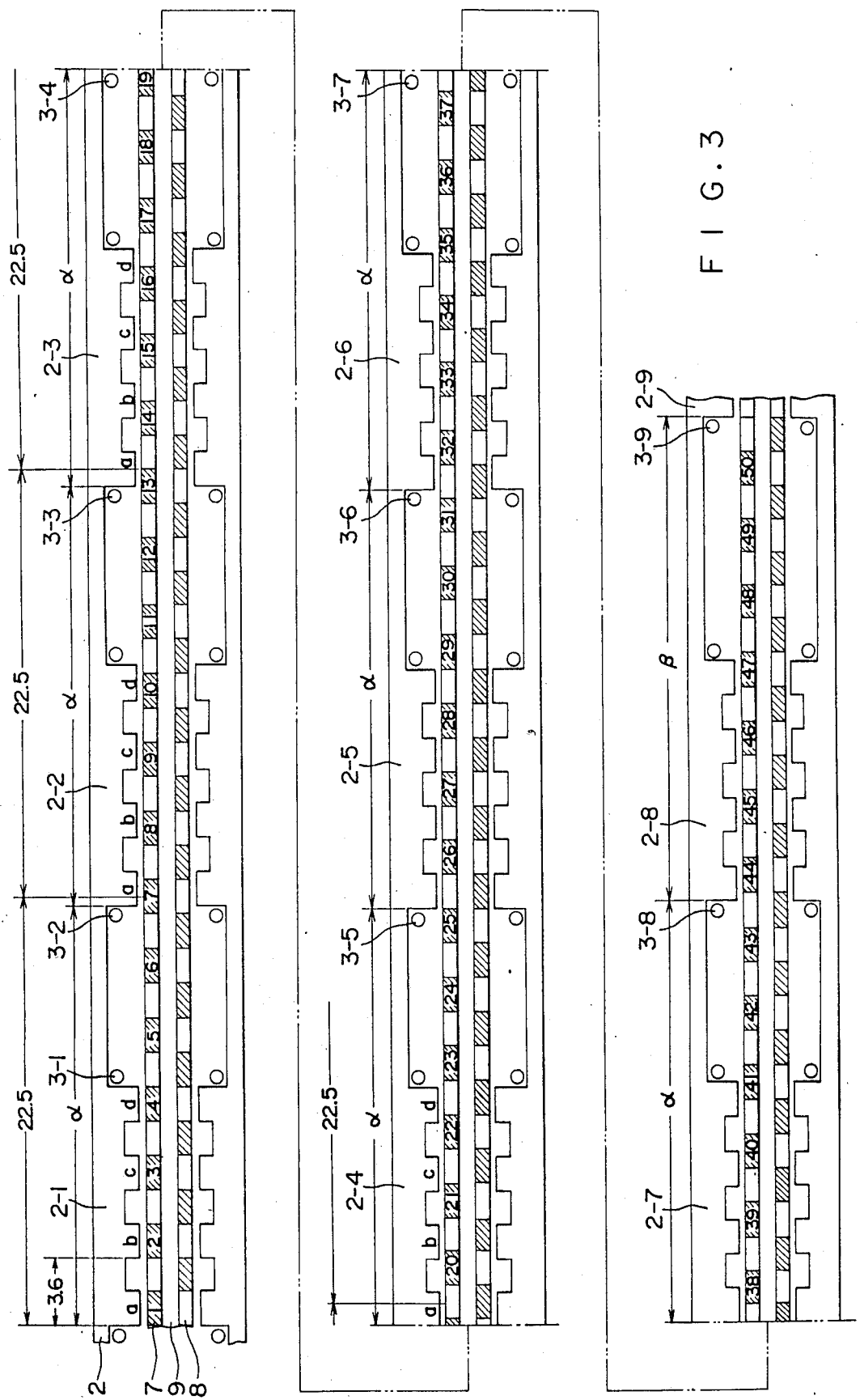
FIG. 3 a development showing a correlation between pole teeth of stator poles and pole teeth of rotor poles of the permanent magnet type stepping motor of the present invention.

In the embodiment of the present invention, the number of the magnetic poles of the stator is 16 and the number of pole teeth provided on the peripheries of the rotor poles 7 and 8 is (z) (wherein z=16 m±4; (m) denotes a positive integer) as shown in FIG. 2.

FIG. 3 shows a correlation between the pole teeth of the stator poles and the pole teeth of the rotor poles and hatched parts denote convex parts of the pole teeth of the rotor.

For instance when (m) is 6, each stator pole is arranged in such a manner that, taking the left edge of the pole tooth (a) of the pole 2-1 as reference, the left edge of the corresponding pole tooth (a) of the first pole 2-2 is positioned to the left from the position of $360/16=22.5°$ by $360/100 \times \frac{1}{2} = 3.6 \times \frac{1}{8} = 0.45°$. Then the left edge of the corresponding pole tooth (a) of the second pole 2-3 is positioned to the left from the position of $22.5 \times 2 = 45°$ by $0.45 \times 2 = 0.9°$ and the positions of the magnetic poles up to the pole 2-8 are $(22.5-0.45) \times n$ (wherein n=1, 2, 3 ... 7) degrees and the poles are arranged at the positions corresponding to the numbers less than the pole numbers by one. Then the pole 2-9 is arranged at the position 180° apart from the pole 2-1 and the poles from the pole 2-9 to the pole 2-16 are arranged at the positions whose angles are obtained by the above formula $(22.5-0.45) \times n$ taking (n)s as the numbers less than the pole numbers by 8.

With the arrangement described above, the pitch $\alpha$ between the adjacent poles from the pole 2-1 to the pole 2-8 becomes 22.05° and the pitch between the adjacent poles from the pole 2-9 to the pole 2-16 also become 22.05°. The pitch $\beta$ between the pole 2-8 and the pole 2-9 and the pitch $\beta$ between the pole 2-16 and the pole 2-1 is 25.65° for both.

Among windings 3-1–3-16 wound on the poles 2-1–2-16 respectively, the windings 3-1, 3-5, 3-9 and 3-13 are connected in series in such a manner that the windings 3-5 and 3-13 have the polarity opposite to that of other two windings to form a group of the windings of the first phase as shown in FIG. 4. In the same way, the windings 3-2, 3-6, 3-10 and 3-14 are connected in series to form a group of the windings of the second phase, the windings 3-3, 3-7, 3-11 and 3-15 are connected in series to form a group of windings of the third phase and the windings 3-4, 3-8, 3-12 and 3-16 are connected in series to form a group of windings of the fourth phase. A driving circuit is constituted by connecting winding groups of respective phases to a source $E_1$ through switches $S_1$–$S_4$ and to an opposite polarity source $E_2$ through switches $S_5$–$S_8$.

FIG. 3 shows the condition wherein current is applied to the first phase by making the switch $S_1$ ON and the pole teeth of the rotor poles are aligned with the pole teeth of the magnetic poles on which the windings of the first phase are wound. The pole teeth of the rotor poles facing the pole teeth provided on the magnetic poles 2-2, 2-6, 2-10 and 2-14 on which the windings of the second phase are wound are shifted to the left from the position where they are aligned with those facing pole teeth of the stator poles by 0.45°. In the same way, the pole teeth of the rotor poles facing the pole teeth provided on the magnetic poles on which the windings of the third phase are wound are shifted to the left from the position where they are aligned with those facing pole teeth of the stator poles by 0.9° and further the pole teeth of the rotor poles facing the pole teeth provided on the magnetic poles on which the windings of the fourth phase are wound are shifted to the left from the position where they are aligned with those facing pole teeth of the stator poles by 1.35°.

When the current applied to the first phase is discontinued and applied to the second phase, the magnetic poles 2-2, 2-6, 2-10 and 2-14 are magnetized and the pole teeth provided on the rotor poles facing the pole teeth provided on the tips of the respective magnetic poles are rotated to the right by 0.45° and stopped when they are aligned with the pole teeth of the stator poles. The rotation angle of 0.45° at that time is one step angle of this embodiment of the stepping motor. In the same way, every time that current application is switched successively to the third phase windings and to the fourth phase windings, the rotor poles are rotated to the right by one step.

After the fourth phase, if the reverse current is applied to the windings of the first to the fourth phases by making the switches $S_5$, $S_6$, $S_7$ and $S_8$ ON successively, the rotor poles can be rotated in the same direction step by step. The rotor poles can be rotated in the opposite direction easily by switching the switches in reverse order.

EFFECT OF THE INVENTION

As described above, with the present invention, a stepping motor of one-phase excitation with a step angle of 0.45° can be obtained by a method comprising the steps of:

providing (z), for instance 100, pole teeth on the rotor poles;

providing 16 magnetic poles for the stator;

providing a plurality of pole teeth on the tips of the respective stator poles with the pitch nearly the same as the pitch of the pole teeth on the rotor poles;

arranging the pitch between adjacent stator poles from the pole 2-1 to the pole 2-8 and the pole 2-9 to 2-16 to be identically 22.05° and the pitch between the poles 2-8 and 2-9 and the poles 2-16 and 2-1 to be identically 25.65°;

dividing 16 windings wound on the respective stator poles into 4 groups of windings by connecting the windings which have same discrepancy angle between the facing pole teeth of the rotor poles and the pole teeth of themselves in series in such a manner that the polarities of the adjacent windings are opposite to each other; and the current is applied to those 4 groups of windings successively by bipolar driving.

Note that the same operation can be achieved by 8-phase unipolar driving method wherein each winding on each magnetic pole is divided into two to compose bifilar windings and 2 groups of 4-phase windings are formed and the current is applied to the respective winding through switches $S_1$–$S_8$ successively. It is to be understood that in the abovementioned embodiment, the pitches between the poles 2-8 and 2-9 and the poles 2-16 and 2-1 are made identically 25.65° but this description is not intended as a definition of the limits of the invention and the portions with this pitch can be provided at optional two positions.

Note also that even 100 pole teeth are provided on the rotor poles and 16 poles are provided in the stator, if the stator poles are arranged with the same pitch, i.e. 360/16=22.5°, when pole teeth of one stator pole and pole teeth of the rotor poles are aligned together, a discrepancy angle, or a step angle, between the pole teeth of the adjacent pole and the pole teeth of the rotor poles becomes $\frac{1}{4} \times 360/100 = 0.9°$, which is two times of the step angle 0.45° of the present invention and the effect of the present invention cannot be obtained.

Relations between (m), (z) and a step angle ($\theta$) are as shown in the following table:

| z = 16 m + 4 | | | z = 16 m − 4 | |
|---|---|---|---|---|
| m | z | θ° | z | θ° |
| 1 | 20 | 2.25 | 12 | 3.75 |
| 2 | 36 | 1.25 | 28 | 1.6071 |
| 3 | 52 | 0.8653 | 44 | 1.0227 |
| 4 | 68 | 0.6617 | 60 | 0.75 |
| 5 | 84 | 0.5357 | 76 | 1.1842 |
| 6 | 100 | 0.45 | 92 | 0.4891 |
| 7 | 116 | 0.3879 | 108 | 0.4166 |
| 8 | 132 | 0.3409 | 124 | 0.3629 |
| 9 | 148 | 0.3040 | 140 | 0.4285 |
| 10 | 164 | 0.2743 | 156 | 0.2884 |
| 11 | 180 | 0.25 | 172 | 0.2616 |
| 12 | 196 | 0.2296 | 188 | 0.2393 |

What is claimed is:

1. A permanent magnet type stepping motor comprising a stator housing having end walls, a stator affixed within said stator housing, a shaft rotatably mounted in said end walls, and two rotor poles and a permanent magnet coaxially affixed to said shaft, said shaft being located coaxially inside said stator, with said permanent magnet located on said shaft between said two rotor poles, wherein said stator has 16 magnetic stator poles provided radially on its inside periphery, each stator pole thus having a pitch between itself and each adjacent stator pole, there being thus a total of 16 stator pitches;

a plurality of stator pole teeth being provided on each tip of said magnetic stator poles with an identical pitch between all of said stator pole teeth on each stator pole;

windings applied on said magnetic stator poles;

rotor pole teeth with the same pitch as the stator pole teeth provided on the entire peripheries of said two rotor poles;

said permanent magnet being magnetized in the axial direction of said shaft;

and wherein, when the number of rotor pole teeth is z, wherein $z = 16m \pm 4$, m denoting a positive integer, 14 of said 16 stator pole pitches are $22.5 \mp 45/z$ degrees, and the other two stator pole pitches are $22.5 \pm 315/z$ degrees.

2. A permanent magnet type stepping motor as claimed in claim 1 wherein the number of rotor pole teeth is 100 and wherein 14 of the 16 stator pole pitches are about 22.05 degrees and the other two stator pole pitches are about 25.65 degrees.

3. A permanent magnet type stepping motor as claimed in claim 1 wherein the two stator pole pitches of $22.5 \pm 315/z$ degrees are located on said stator diametrically opposed to each other.

* * * * *